United States Patent [19]

Cramers

[11] 3,862,253

[45] Jan. 21, 1975

[54] PROCESS FOR THE PREPARATION OF CYCLOPENTADIENES

[75] Inventor: Constant M. A. Cramers, Obbicht, Netherlands

[73] Assignee: Stamicarbon B.V., Geleen, Netherlands

[22] Filed: Feb. 25, 1974

[21] Appl. No.: 445,547

[30] Foreign Application Priority Data
Mar. 1, 1973 Netherlands.................... 7302864

[52] U.S. Cl. .................. 260/666 A, 260/666 PY
[51] Int. Cl. .............................................. C07c 13/14
[58] Field of Search ................... 260/666 A, 666 PY

[56] References Cited
UNITED STATES PATENTS

| | | | |
|---|---|---|---|
| 2,453,044 | 11/1948 | Staff.................................. | 260/666 R |
| 2,801,270 | 7/1957 | Nelson et al..................... | 260/666 R |
| 2,913,504 | 11/1959 | Hillard, Jr. et al.............. | 260/666 A |
| 2,994,724 | 8/1961 | Hillard, Jr. et al.............. | 260/666 A |
| 3,340,315 | 9/1967 | Renner.......................... | 260/666 A |

*Primary Examiner*—Delbert E. Gantz
*Assistant Examiner*—Veronica O'Keefe
*Attorney, Agent, or Firm*—Cushman, Darby & Cushman

[57] ABSTRACT

An improved process for the thermal decomposition of dicyclopentadiene and methyl-substituted dicyclopentadienes into cyclopentadienes and methylcyclopentadienes is described, wherein the conversion is carried out at particularly high yields and in the substantial absence of reactor-fouling problems by maintaining the molecular oxygen content in the gaseous reaction mixture below about 10 parts per million and also maintaining reactor conditions at a partial dicyclopentadiene pressure below the vapor pressure of the dicyclopentadiene under conversion at the prevailing temperature employed in the process.

4 Claims, No Drawings

PROCESS FOR THE PREPARATION OF CYCLOPENTADIENES

The invention relates to a process for preparing cyclopentadienes by thermal conversion of dicyclopentadienes. Such processes are presently carried out on an industrial scale using either a liquid phase process or a gaseous phase process.

The thermal decomposition of a dicyclopentadiene into a cyclopentadiene has typically been accompanied by the formation of by-products, which not only adversely affects the yield of the desired product, but, in addition, these by-products may seriously foul the reactor. Such reactor fouling results in frequent shut-downs of the plant, for cleaning, which not only adds to the expense of the operation of the process, but also very seriously adversely affects the average daily production of the desired product. The existing literature contains a great many proposals for avoiding the undesirable formation of said by-products, but as yet the yield obtained from the prior art processes has proven to be unsatisfactorily low in practice.

It has now been found according to this invention that dicyclopentadienes can be converted into cyclopentadienes with a particularly high yield if the reaction is effected solely in the gaseous phase, while maintaining the molecular oxygen content in the entire gaseous reaction mixture at a level below about 10 parts per million (ppm).

It is of particular importance in this invention that no liquid phase containing dicyclopentadiene is present in the reaction vessel. This means that the formation of a mist is achieved in the present invention by carrying out the process at a partial dicyclopentadiene pressure that is less than the vapor pressure of the dicyclopentadiene at the prevailing temperature employed in the process, e.g., at a partial pressure of at least about 10 percent and up to about 30 percent below said vapor pressure, or even up to about 80 percent therebelow.

The dicyclopentadienes which may be converted in this process, according to the invention, include unsubstituted dicyclopentadiene itself and dicyclopentadienes substituted with one or more methyl groups. Unsubstituted dicyclopentadiene and the di(monoethylcyclopentadienes) are of particular practical importance. The compounds cyclopentadiene and methyl cyclopentadiene obtained by the conversion process are widely used, e.g., as starting materials for further chemical conversions. An example of such a conversion is the preparation of 5-ethylidenenorbornene-2, which may be used as a comonomer in the manufacture of rubbery copolymers of ethylene, propylene and one or more other monomers, by combining cyclopentadiene and butadiene to form 5-vinylnorbornene-2, followed by isomerization to 5-ethylidenenorbornene-2.

The other reaction conditions employed in the conversion of dicyclopentadienes into cyclopentadienes according to this invention need not be different from those used in the known gaseous phase processes for this conversion. Thus, the temperature may be within the range of between about 170° and 400°C, preferably between about 240° and 340°C. Residence time in the reactor may be between about 0.5 and 100 sec, dependent on temperature. At reaction temperatures in the preferred range residence time is preferably between about 1 and 8 sec. Inert gaseous diluents may be present, although this is not necessary. Preferably, the partial pressure of the dicyclopentadiene vapor is not lower than 0.1 atm. The total reaction pressure is not itself critical, and use may be made of pressures not far from atmospheric pressure, e.g., preferably between about 0.5 and 2 atm., however, higher and lower pressures, e.g., within the range of about 0.1 to 10 atm. may be used. Naturally, if no inert gaseous diluent is present, the reaction pressure must be less than the vapor pressure of the dicyclopentadiene at the reaction temperature employed.

EXAMPLE

A mixture of 2.76 moles/hour of dicyclopentadiene vapor and 7 litres/hour of nitrogen gas was passed through a tubular reactor, filled with iron curls, which is maintained at a temperature of about 290°C. The pressure employed is about 1 atmosphere. Before introduction into the reactor, the nitrogen gas was treated with a deoxo catalyst (a hydrogen-treated palladium-on-alumina catalyst was used) and dried by means of a molecular sieve (type 3 A, composed of cristalline potassium aluminum silicate was used). Also, prior to evaporating the dicyclopentadiene it was treated to remove dissolved oxygen therefrom by passing the nitrogen through the liquid dicyclopentadiene. The resulting gaseous dicyclopentadiene-nitrogen mixture as fed to the tubular reactor contains in this example no more than about 0.1 ppm of molecular oxygen. Residence time in the reactor is about 4 seconds. The conversion efficiency of the process is about 96–97 percent, and the yield of cyclopentadiene, calculated on the amount of dicyclopentadiene in the feedstock is 98–100 percent.

Even after 6 months of continuous operation, it was found that the reactor was not fouled to any appreciable extent, and that shut-downs due to fouling had been avoided.

COMPARATIVE EXAMPLE

The same procedure was used, as in the example above. However, the nitrogen gas employed had not been freed of oxygen, and the dicyclopentadiene vapor had been obtained by evaporation of liquid dicyclopentadiene, which in equilibrium with air at 25°C., and hence contained dissolved oxygen. The gaseous dicyclopentadiene-nitrogen mixture thus fed to the tubular reactor contained 15 ppm of molecular oxygen. After only three weeks of continuous operation the process had to be shut-down because of fouling of the reactor, which had to be cleaned out before resuming the reaction.

In addition, serious fouling of the reactor also occurred at early stages in process when the reaction was conducted under conditions that permitted the small droplets of liquid dicyclopentadiene to be present in the reactor, even though the gaseous dicyclopentadiene-nitrogen mixture fed to the tubular reactor contained less than 0.1 ppm of molecular oxygen.

What is claimed is:

1. In a process for the thermal conversion in a reaction zone of dicyclopentadiene compound-containing feeds to the corresponding cyclopentadienes in the presence of nitrogen gas diluent, the improvement consisting in removing oxygen from said nitrogen gas to an oxygen level below 10 ppm, preparing a gaseous mixture of said nitrogen with a vaporized dicyclopentadiene, which mixture contains less than 10 ppm of oxygen, and using this mixture as feedstock for the gaseous phase thermal conversion of the dicyclopentadiene into the corresponding cyclopentadiene, while maintaining an absence of any liquid dicyclopentadiene in the reaction zone.

2. The process according to claim 1, wherein the partial dicyclopentadiene pressure is maintained within about 70 to 90 percent of the vapor pressure of the dicyclopentadiene at the reaction temperature employed.

3. The process according to claim 1 wherein the dicyclopentadiene compound employed is dicyclopentadiene.

4. The process according to claim 1 wherein the dicyclopentadiene compound employed is a di(monoethylcyclopentadiene).

* * * * *

UNITED STATES PATENT OFFICE
CERTIFICATE OF CORRECTION

Patent No.: 3,862,253     Dated January 21, 1975

Inventor(s): Constant M. A. Cramers

It is certified that error appears in the above-identified patent and that said Letters Patent are hereby corrected as shown below:

Column 1, line 33, change "achieved" to --obviated--.

Column 1, line 44, change "di(monoethylcyclopentadienes)" to --di(monomethylcyclopentadienes)--.

Claim 4, change "di(monoethylcyclopentadienes) to --di(monomethylcyclopentadienes)--.

Signed and Sealed this thirteenth Day of January 1976

[SEAL]

Attest:

RUTH C. MASON
Attesting Officer

C. MARSHALL DANN
Commissioner of Patents and Trademarks